(12) United States Patent
Bates et al.

(10) Patent No.: US 8,910,136 B2
(45) Date of Patent: Dec. 9, 2014

(54) GENERATING CODE THAT CALLS FUNCTIONS BASED ON TYPES OF MEMORY

(75) Inventors: Cary L. Bates, Rochester, MN (US); Nicholas P. Johnson, Rochester, MN (US); Justin K. King, Rochester, MN (US); Lee Nee, Rochester, MN (US); Siobhan M. O'Toole, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 13/225,040

(22) Filed: Sep. 2, 2011

(65) Prior Publication Data
US 2013/0061007 A1 Mar. 7, 2013

(51) Int. Cl.
| G06F 12/08 | (2006.01) |
| G06F 12/06 | (2006.01) |
| G06F 9/44 | (2006.01) |
| G06F 12/02 | (2006.01) |
| G06F 12/10 | (2006.01) |

(52) U.S. Cl.
CPC ............ *G06F 12/06* (2013.01); *G06F 12/0246* (2013.01); *G06F 12/1009* (2013.01); *G06F 12/08* (2013.01); *G06F 2212/205* (2013.01); *G06F 9/4425* (2013.01)
USPC ............................ 717/162; 711/100; 711/154

(58) Field of Classification Search
CPC .. G06F 12/08; G06F 12/0246; G06F 12/1009
USPC ................................... 717/162; 711/154, 100
See application file for complete search history.

(56) References Cited

U.S. PATENT DOCUMENTS

| 5,093,914 | A | * | 3/1992 | Coplien et al. | ................ 717/129 |
| 5,341,483 | A | | 8/1994 | Frank et al. | |
| 5,432,742 | A | | 7/1995 | Ihara et al. | |
| 5,701,438 | A | | 12/1997 | Bains | |
| 5,737,605 | A | * | 4/1998 | Cunningham et al. | ........ 719/312 |
| 5,742,797 | A | | 4/1998 | Celi, Jr. et al. | |
| 5,751,996 | A | * | 5/1998 | Glew et al. | .................... 711/145 |
| 6,968,438 | B1 | * | 11/2005 | Russo et al. | .................. 711/170 |
| 2003/0005418 | A1 | | 1/2003 | Sridhar et al. | |
| 2008/0162825 | A1 | | 7/2008 | Cascaval et al. | |
| 2010/0106895 | A1 | * | 4/2010 | Condit et al. | ................. 711/103 |
| 2010/0223438 | A1 | | 9/2010 | Vermeulen et al. | |

OTHER PUBLICATIONS

Nidhi Aggarwal et al., "Configurable Isolation: Building High Availability Systems with Commodity Multi-Core Processors," ISCA '07, Jun. 9-13, 2007, pp. 470-481, ACM, San Diego, USA.

\* cited by examiner

*Primary Examiner* — Jonathan C Teixeira Moffat
*Assistant Examiner* — Lynda Dinh
(74) *Attorney, Agent, or Firm* — Owen J. Gamon; Roy W. Truelson

(57) ABSTRACT

In an embodiment, in response to reading a declaration of a function that specifies a name of the function and a type of memory on which the function operates, the name of the function, a pointer to the function, and the type are saved to a template. In response to reading a call statement that specifies the name of the function and an identifier of an object, first code is generated. The first code, when executed, reads the pointer to the function from a virtual function table pointed to by the object, finds an entry in the virtual function table that represents the function, and reads the pointer from the entry in the virtual function table. The call statement, when executed, requests a call of the function. Second code is generated that, when executed, calls the function using the pointer read from the virtual function table.

18 Claims, 6 Drawing Sheets

GENERATING CODE THAT CALLS FUNCTIONS BASED ON TYPES OF MEMORY

FIELD

An embodiment of the invention generally relates to computer systems and more particularly to computer systems that access data stored in a plurality of types of memory.

BACKGROUND

Computer systems typically comprise a combination of computer programs and hardware, such as semiconductors, transistors, chips, circuit boards, memory, storage devices, and processors. The computer programs are stored in the memory and/or storage devices and are executed by the processors. Fundamentally, computer systems are used for the storage, manipulation, and analysis of data, which is stored in the memory and/or storage devices.

Computer systems may have multiple hierarchies of directly addressable memory types with different properties. Examples of memory types include PCM (Phase Change Memory), NAND flash, NOR flash, and DRAM (Dynamic Random Access Memory). Examples of memory properties include cost per byte, persistence, latency, write endurance, erase time, write time, and memory wear (the upper limit of program/erase cycles). Computer systems may need to implement different functions in order to support different types of memory. For example, DRAM may allow a computer system write function to write bytes of memory without first erasing the memory while flash memory may require a write function to erase a block of data before the write function may rewrite bytes of the memory with new data. As another example, DRAM is volatile memory while PCM is persistent or non-volatile memory, so a function that writes a record to a database table in DRAM may choose to always save the contents of the record to secondary storage, but a function that writes a record to a database table in PCM may choose to save the contents of the record to secondary storage only if the PCM is more than 90% full.

SUMMARY

A method, computer-readable storage medium, and computer system are provided. In an embodiment, in response to reading a declaration of a function that specifies a name of the function and a type of memory on which the function operates, the name of the function, a pointer to the function, and the type are saved to a template. In response to reading a call statement that specifies the name of the function and an identifier of an object, first code is generated. The first code, when executed, reads the pointer to the function from a virtual function table pointed to by the object, finds an entry in the virtual function table that represents the function, and reads the pointer from the entry in the virtual function table. The call statement, when executed, requests a call of the function. Second code is generated that, when executed, calls the function using the pointer read from the virtual function table.

It is to be noted, however, that the appended drawings illustrate only example embodiments of the invention, and are therefore not considered a limitation of the scope of other embodiments of the invention.

DETAILED DESCRIPTION

Figure 1:
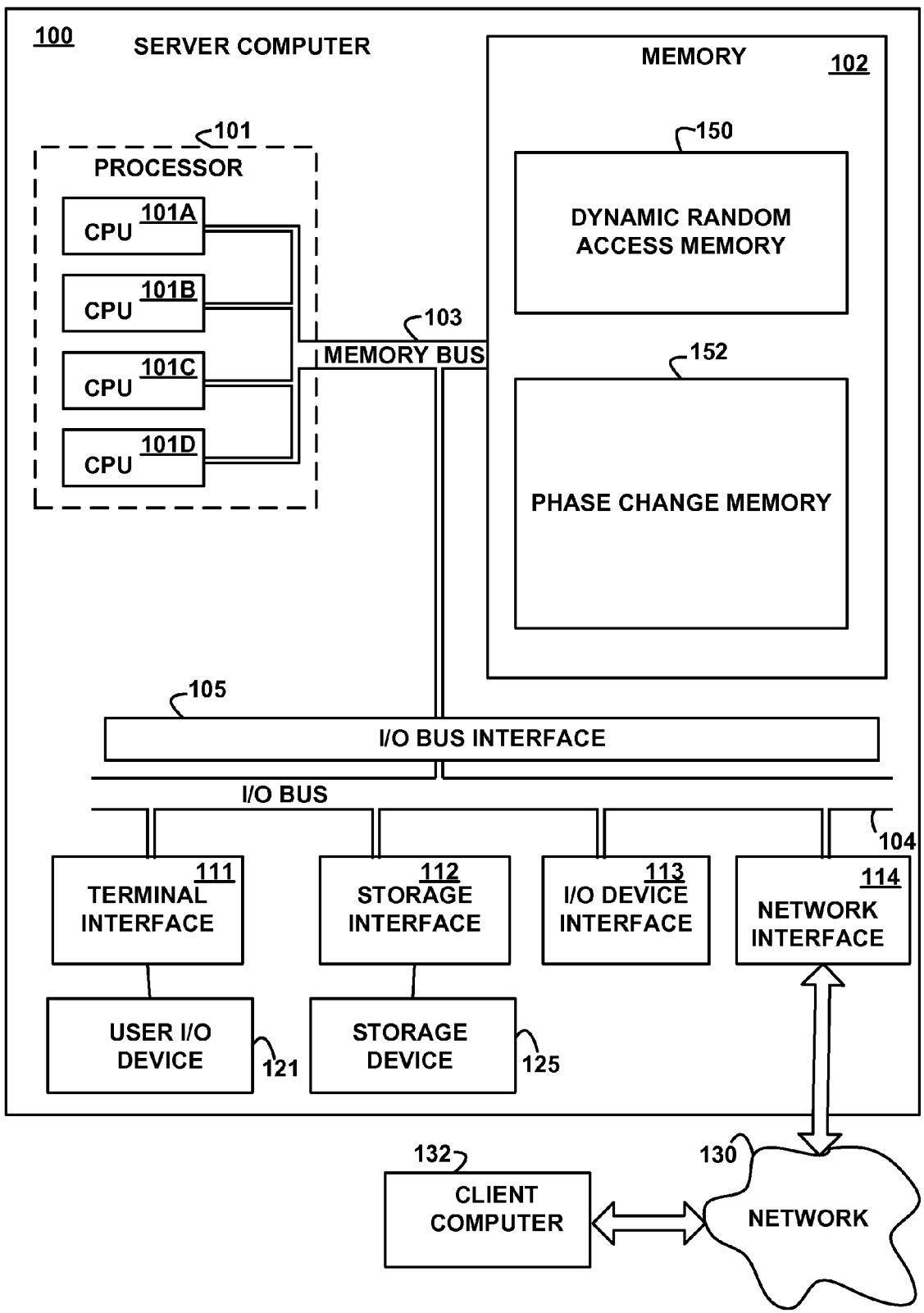
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In an embodiment, the main memory 102 comprises Dynamic Random Access Memory (DRAM) 150 and Phase Change Memory (PCM) 152. In addition to or instead of PCM and DRAM, other types of memory may be used. The other types may be subtypes in a hierarchical arrangement, such as PCM-A or PCM-B, which represent portions of PCM, or DRAM-A or DRAM-B, which represent portions of DRAM. A type of memory is a category or class of memory, and all storage devices that implement memory of the same type share the same memory operating characteristics or memory properties. Examples of characteristics or properties include persistence, latency, write endurance, erase time, write time, and memory wear (the upper limit of program/erase cycles).

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented as an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The computer system 132 may comprise some or all of the hardware and/or computer program elements of the computer system 100.

FIG. 1 is intended to depict the representative major components of the computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
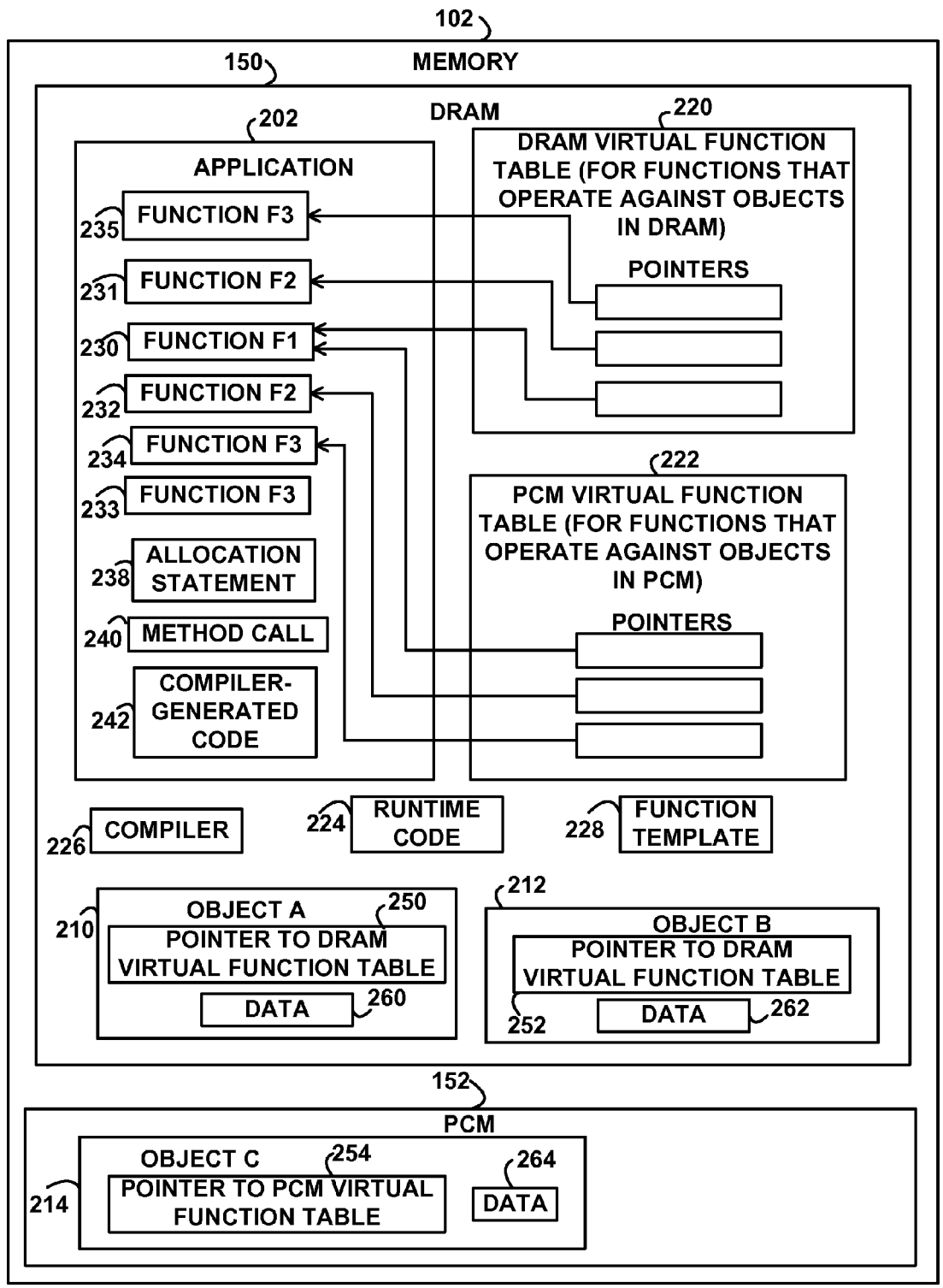
FIG. 2 depicts a block diagram of example memory, according to an embodiment of the invention.

FIG. 2 depicts a block diagram of example memory 102, according to an embodiment of the invention. The example memory 102 comprises DRAM 150 and PCM 152. The example DRAM 150 stores an application 202, an object A 210, an object B 212, a DRAM virtual function table 220, a PCM virtual function table 222, runtime code 224, a compiler 226, and a function template 228. The example PCM 152 comprises an object C 214.

Although the DRAM 150 is illustrated as storing the application 202, the DRAM virtual function table 220, the PCM virtual function table 222, the runtime code 224, the compiler 226, and the function template 228, in other embodiments, any, some, or all of them may be stored in the PCM 152. Although the application 202, the DRAM virtual function table 220, the PCM virtual function table 222, the runtime code 224, the compiler 226, and the function template 228 are illustrated as being separate elements, in other embodiments, any, some, or all of them may be packaged together.

The computer system 100 may use virtual addressing mechanisms that allow the programs of the computer system 100 to behave as if they only have access to a large, single storage entity instead of access to multiple, smaller storage entities. Thus, while the application 202, the object A 210, the object B 212, the DRAM virtual function table 220, the PCM virtual function table 222, the runtime code 224, the compiler 226, and the function template 228 are illustrated as being contained within the DRAM 150, these elements are not necessarily all completely contained in the same storage device at the same time. For example, multiple DRAM storage devices may exist with any some or all of the application 202, the object A 210, the object B 212, the DRAM virtual function table 220, the PCM virtual function table 222, the runtime code 224, the compiler 226, and the function template 228 being stored within different storage devices that all have the DRAM type. Analogously, elements may be stored in different storage devices that all have the PCM type.

The application 202 comprises a function F1 230, a function F2 231, a function F2 232, a function F3 233, a function F3 234, a function F3 235, an allocation statement 238, a method call statement 240, and compiler-generated code 242. The object A 210 comprises data 260 and a pointer 250, which points at or contain the address of the DRAM virtual function table 220. The object B 212 comprises data 262 and a pointer 252, which points at or contain the address of the DRAM virtual function table 220. The object C 214 comprises data 264 and a pointer 254, which points at or contain the address of the PCM virtual function table 222. The pointer 250 in the object A 210 and the pointer 252 in the object B 212 point at the DRAM virtual function table 220 because the object A 210 and the object B 212 are stored in the DRAM 150 (are stored in memory of the DRAM type), so the type of memory in which object A 210 and the object B 212 are stored matches the assigned type of the virtual function table 220 to which the pointer 250 and the pointer 252 point. The pointer 254 in the object C 214 points at the PCM virtual function table 222 because the object C 214 is stored in the PCM 152 (is stored in memory of the PCM type), so the type of memory in which the object C 214 is stored matches the assigned type of the virtual function table 222 to which the pointer 254 points. Thus, the respective pointers 250, 252, and 254 point at (comprise the address of) the respective virtual function table that is assigned to the type of memory in which the respective object that comprises the respective pointer is stored.

The virtual function table 220 is assigned to the type of DRAM, meaning that the virtual function table 220 comprises pointers that contain the addresses of functions that operate on and read/write from/to objects that are stored in memory of the type DRAM and does not comprise pointers that contain the addresses of functions that are not capable of operating on and reading/writing from/to objects that are stored in memory of the type DRAM. The virtual function table 222 is assigned to the type of PCM, meaning that the virtual function table 222 comprises pointers that contain the addresses of functions that operate on and read/write from/to objects that are stored in memory of the type PCM and does not comprise pointers that contain the addresses of functions that are not capable of operating on and reading/writing from/ to objects that are stored in memory of the type PCM. In an embodiment, some functions operate on and read/write from/ to objects of multiple types, and such functions may be pointed to by multiple virtual function tables that are assigned to multiple respective types. Each application 202 (in another embodiment, each class) has its own virtual function table, so that different virtual function tables exist for each application 202.

When executed by the processor 101, the allocation statement 238 allocates or creates an object in memory, e.g., the object A 210, the object B 212, or the object C 214. When executed, the method call statement 240 calls a function (e.g., the function F1 230, the function F2 231, the function F2 232, the function F3 233, the function F3 234, or the function F3 235) and associates an allocated object (A, B, or C) with the function, meaning the function can read and/or write the data in the object, such as the data 260, the data 262, or the data 264. The compiler 226 generates or creates the compiler-generated code 242.

In an embodiment, the application 202, the compiler 226, the runtime code 224, the function F1 230, the function F2 231, the function F2 232, the function F3 233, the function F3 234, and/or the function F3 235 comprise instructions or statements that execute on the processor 101 or instructions or statements that are interpreted by instructions or statements that execute on the processor 101, to carry out the functions as further described below with reference to FIGS. 3, 4, 5, 6, and 7. In another embodiment, the application 202, the compiler 226, the runtime code 224, the function F1 230, the function F2 231, the function F2 232, the function F3 233, the function F3 234, and/or the function F3 235 are implemented in hardware via semiconductor devices, chips, logical gates, circuits, circuit cards, and/or other physical hardware devices in lieu of, or in addition to, a processor-based system. In an embodiment, the application 202, the compiler 226, the runtime code 224, the function F1 230, the function F2 231, the function F2 232, the function F3 233, the function F3 234, and/or the function F3 235 comprise data in addition to instructions or statements. In various embodiments, the application 202 is a user application, a third-party application, an operating system, or any portion, multiple, or combination thereof.

Figure 3:
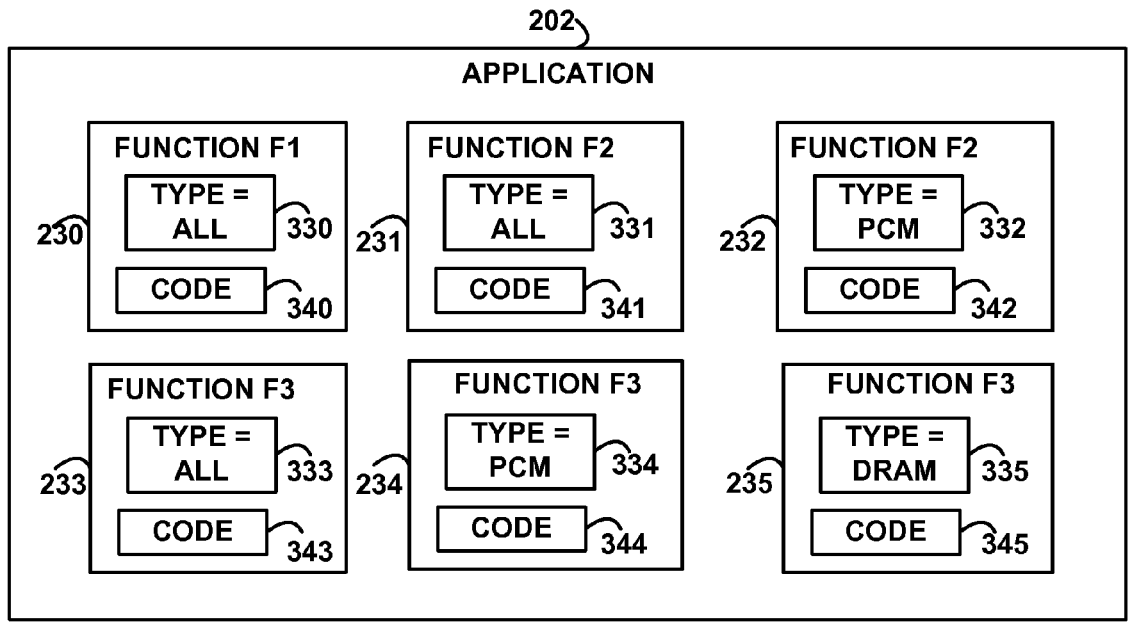
FIG. 3 depicts a block diagram of an example application, according to an embodiment of the invention.

FIG. 3 depicts a block diagram of an example application 202, according to an embodiment of the invention. The example application 202 comprises an example function F1 230, an example function F2 231, an example function F2 232, an example function F3 233, an example function F3 234, and an example function F3 235. The function F1 230, the function F2 231, the function F2 232, the function F3 233, the function F3 234, and the function F3 235 declare or define their respective functions.

The example functions 230, 231, 232, 233, 234, and 235 each comprises a respective name (e.g., F1, F2, and F3). The example functions 230, 231, 232, 233, 234, and 235 further comprise a respective memory type flag 330, 331, 332, 333, 334, and 335, which indicate whether the respective function operates against (reads from and/or writes to) objects stored in memory of the DRAM type, operates against objects stored in memory of the PCM type, or operates against objects stored in all types of the memory 102. In other embodiments, other types of memory may be used. Some or all of the functions may have the same names or identifiers because the functions with the same names may perform the operations against objects in different types of memory. For example, the functions 231 and 232 both share the same name of "F2," as the function 231 performs operations against objects in all types of memory while the function 232 performs operations only against objects stored in memory of the PCM type. As another example, the functions 233, 234, and 235 all share the same name of "F3," as the function 233 performs operations against objects in all types of memory while the function 234 performs operations only against objects stored in memory of the PCM type, and the function 235 performs operations only against objects stored in memory of the DRAM type.

The example functions 230, 231, 232, 233, 234, and 235 each comprises respective code 340, 341, 342, 343, 344, and 345. The code 340, 341, 342, 343, 344, and 345 comprise instructions that execute on the processor 101 or statements that are interpreted by instructions that execute on the processor 101, in order to operate against or access the objects 210, 212, and/or 214 stored in the memory 102.

Figure 4:
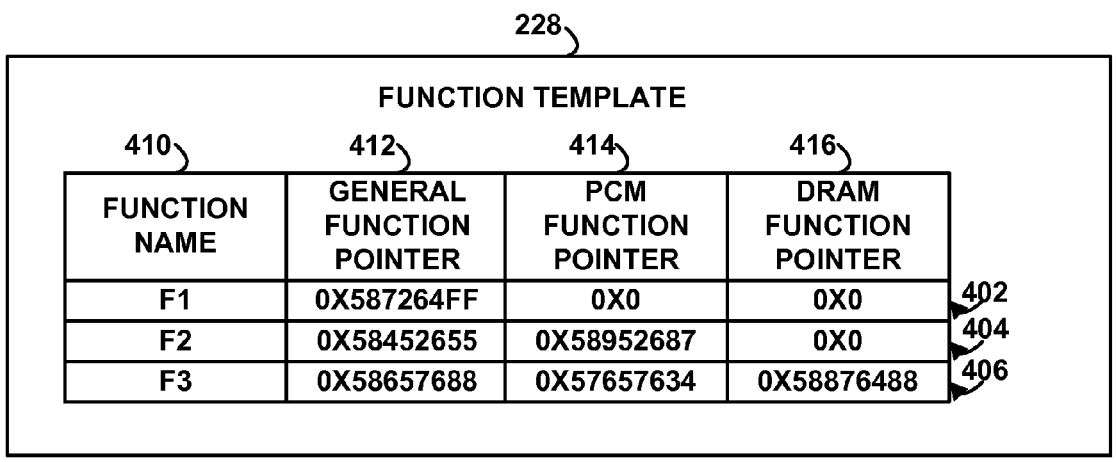
FIG. 4 depicts a block diagram of an example data structure for a function template, according to an embodiment of the invention.

FIG. 4 depicts a block diagram of an example data structure for a function template 228, according to an embodiment of the invention. The function template 228 comprises example entries 402, 404, and 406, each of which comprises an example function name field 410, a general function pointer field 412, a PCM function pointer field 414, and a DRAM function pointer field 416.

The function name field 410 stores a name or identifier of the functions 230, 231, 232, 233, 234, or 235. The function name field 410 does not necessarily uniquely identify a function. The general function pointer field 412 stores the address of a function, having the name in the function name field 410 in the same entry, that operates against, accesses, or reads/writes data in an object that is stored in all types of the memory 102. If the general function pointer 412 contains an address, that address uniquely identifies a function. The PCM function pointer field 414 stores the address of a function, having the name in the function name field 410 in the same entry, that operates against, accesses, or reads/writes data in an object that is stored in memory of the PCM type. If the PCM function pointer 414 contains an address, that address uniquely identifies a function. The DRAM function pointer field 416 stores the address of a function that has the name in the function name field 410 in the same entry, that operates against, accesses, or reads/writes data in an object that is stored in memory of the DRAM type. If the DRAM function pointer 416 contains an address, that address uniquely identifies a function. In an embodiment, the function template 228 may comprise indicators of other memory types in addition to, or in lieu of the PCM and DRAM memory types.

Figure 5:
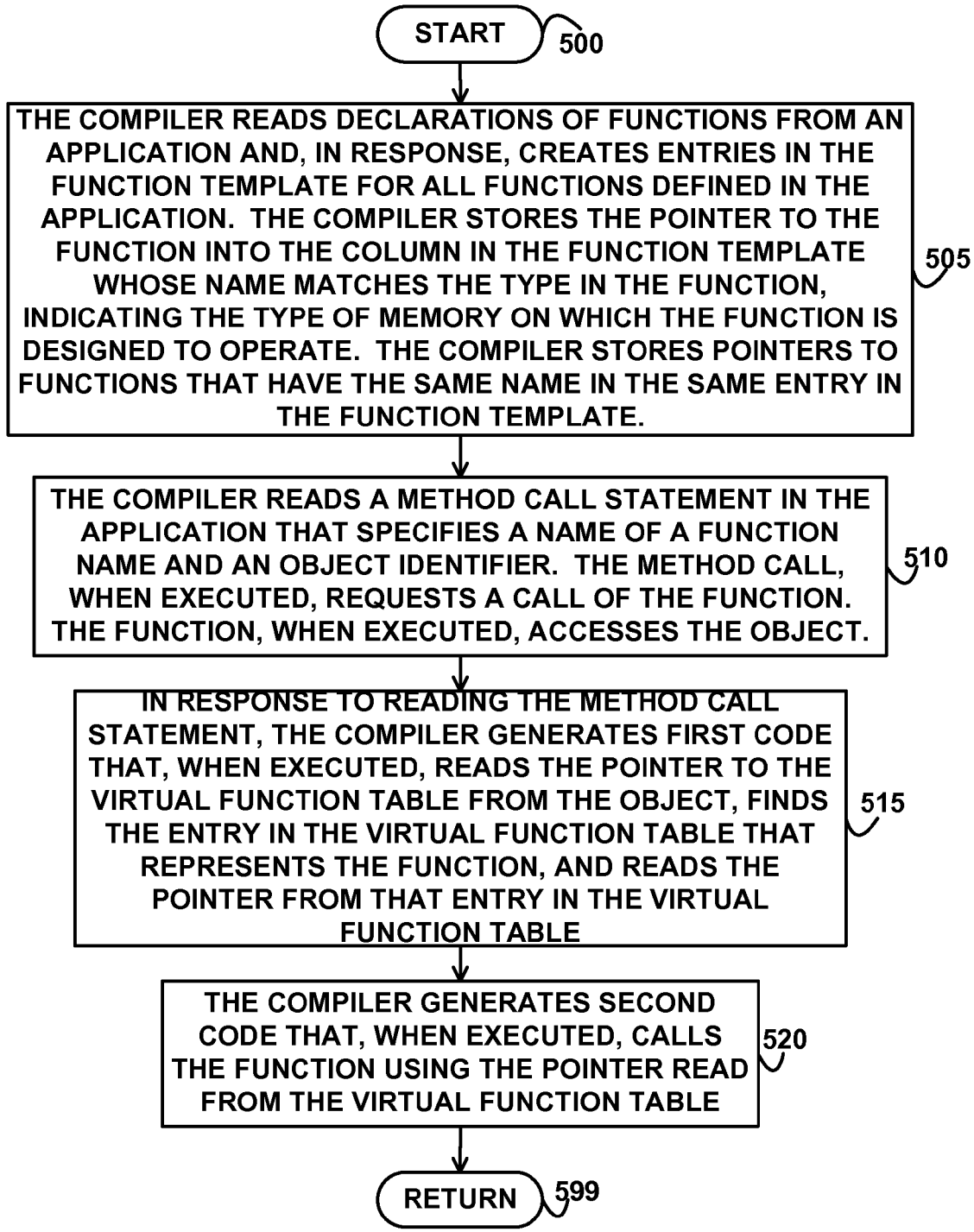
FIG. 5 depicts a flowchart of example processing for a compiler, according to an embodiment of the invention.

FIG. 5 depicts a flowchart of example processing for a compiler, according to an embodiment of the invention. Control begins at block 500. Control then continues to block 505 where the compiler 226 reads declarations of functions (such as the functions 230, 231, 232, 233, 234, and 235) from an application 202 and, in response, creates entries in the function template 228 for all functions defined or declared in the application 202. The compiler 226 stores the pointer to the function into the column in the function template 228 whose name matches the type in the function, indicating the type of memory on which the function is designed to operate. The compiler 226 stores pointers to functions that have the same name in the same entry in the function template 228. The compiler 226 may also store the type to the function template 228.

Control then continues to block 510 where the compiler 226 reads a method call statement 240 in the application 202 that specifies a name of a function and an object identifier. The method call statement 240, when executed, requests a call of the function, such as one of the functions 230, 231, 232, 233, 234, or 235. The function, when executed, accesses the object identified by the object identifier.

Control then continues to block 515 where, in response to reading the method call statement 240, the compiler 226 generates first code of the compiler-generated code 242 that, when executed, reads the pointer to the virtual function table 220 or 222 from the pointer 250, 252, or 254 in the object 210, 212, or 214, finds the entry in the virtual function table 220 or 222 that represents the named function, and reads the pointer from that entry in the virtual function table 220 or 222.

Control then continues to block 520 where the compiler 226 generates second code that, when executed, calls the function 230, 231, 232, 233, 234, or 235 using the pointer read from the virtual function table 220 or 222. Control then continues to block 599 where the logic of FIG. 5 returns.

The terms "first code" and "second code" are labels or identifiers used for convenience of exposition only and are generically referred to by the compiler-generated code 242. Each of the first code and the second code may comprise one or more instructions executed by the processor 101, directly or indirectly.

Figure 6:
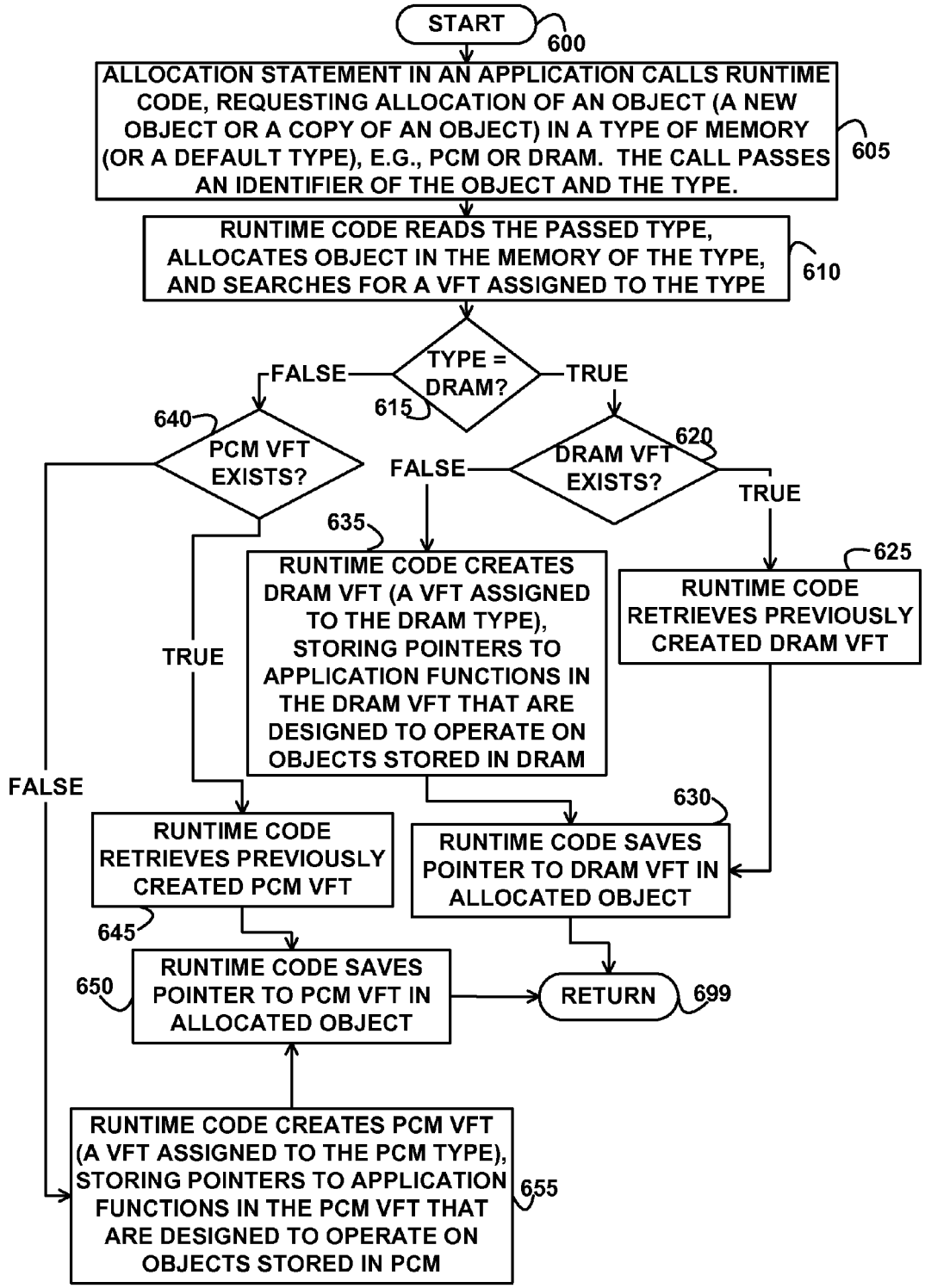
FIG. 6 depicts a flowchart of example processing for runtime code, according to an embodiment of the invention.

FIG. 6 depicts a flowchart of example processing for runtime code, according to an embodiment of the invention. Control begins at block 600. Control then continues to block 605 where the allocation statement 238 in the application 202 calls the runtime code 224, requesting allocation of an object (a new object or a copy of an object) in a type of memory (or a default type), e.g., PCM or DRAM. The call passes an identifier of the object and the type to the runtime code 224. Control then continues to block 610 where the runtime code 224 reads the passed type, allocates the object in the memory of the type, and searches for a virtual function table assigned to the type.

Control then continues to block 615 where the runtime code 224 determines the type of the memory that the allocation statement 238 specified. For example, the runtime code 224 determines whether the specified type is DRAM. If the determination at block 615 is true, then the memory type specified by the allocation statement 238 is DRAM, so control continues to block 620 where the runtime code 224 determines whether a virtual function table exists whose assigned memory type is equal to the memory type specified by the allocation statement 238 (e.g., the runtime code 224 determines whether a virtual function table exists that is assigned the memory type of DRAM).

If the determination at block 620 is true, then a virtual function table exists that is assigned a memory type that is equal to the memory type specified by the allocation statement 238 (e.g., the runtime code 224 determines that a virtual function table exists that is assigned the memory type of DRAM), so control continues to block 625 where the runtime code 224 retrieves or reads the previously created virtual function table that is assigned the specified memory type (e.g., the runtime code 224 reads the previously created DRAM virtual function table 220).

Control then continues to block 630 where the runtime code 224 saves the pointer to the virtual function table that is assigned to the specified memory type into the allocated object in the memory that has the type that matches the specified memory type (e.g., the runtime code 224 saves the pointer to the DRAM virtual function table 220 into the allocated object in the DRAM). Control then continues to block 699 where the logic of FIG. 6 returns.

If the determination at block 620 is false, then a virtual function table does not exist that is assigned a memory type that is equal to the memory type specified by the allocation statement 238 (e.g., the runtime code 224 determines that a virtual function table does not exist that is assigned the memory type of DRAM), so control continues to block 635 where the runtime code 224 creates a virtual function table that is assigned to the specified memory type (e.g., a virtual function table assigned to the DRAM type) and stores pointers to the application functions into the created virtual function table that are designed to operate on objects stored in memory having the specified type (e.g., the runtime code 224 stores pointers to functions that are designed to operate on objects in DRAM into the DRAM virtual function table 220). That is, for each entry in the template, if the column in the template whose name matches the specified memory type contains a pointer to a function that is assigned to the memory type, the runtime code 224 copies that pointer to the virtual function table for that entry. If the column in the template whose name matches the specified memory type does not contain a pointer, the runtime code 224 copies the general function pointer to the virtual function table for that entry, where the general function pointer comprises the address of a general function that operates against objects stored in all types of the memory 102. Control then continues to block 630, as previously described above.

If the determination at block 615 is false, then the specified memory type is not DRAM and, in an embodiment where the only two memory types are DRAM and PCM, the specified memory type is therefore PCM, so control continues to block 640 where the runtime code 224 determines whether a virtual function table exists whose assigned memory type is equal to the memory type specified by the allocation statement 238 (e.g., the runtime code 224 determines whether a virtual function table exists that is assigned the memory type of PCM).

If the determination at block 640 is true, then a virtual function table exists that is assigned a memory type that is equal to the memory type specified by the allocation statement 238 (e.g., the runtime code 224 determines that a virtual function table exists that is assigned the memory type of PCM), so control continues to block 645 where the runtime code 224 retrieves or reads the previously created virtual function table that is assigned the specified memory type (e.g., the runtime code 224 reads the previously created PCM virtual function table 222).

Control then continues to block 650 where the runtime code 224 saves the pointer to the virtual function table that is assigned to the specified memory type into the allocated object in the memory that has the type that matches the specified memory type (e.g., the runtime code 224 saves the pointer to the PCM virtual function table 222 into the allocated object in the PCM). Control then continues to block 699 where the logic of FIG. 6 returns.

If the determination at block 640 is false, then a virtual function table does not exist that is assigned a memory type that is equal to the memory type specified by the allocation statement 238 (e.g., the runtime code 224 determines that a virtual function table does not exist that is assigned the memory type of PCM), so control continues to block 655 where the runtime code 224 creates a virtual function table that is assigned to the specified memory type (e.g., a virtual function table assigned to the PCM type) and stores pointers to the application functions into the created virtual function table that are designed to operate on objects stored in memory having the specified type (e.g., the runtime code 224 stores pointers to functions that are designed to operate on objects in PCM into the PCM virtual function table). That is, for each entry in the template, if the column in the template whose name matches the specified memory type contains a pointer, the runtime code 224 copies that pointer to the virtual function table for that entry. If the column in the template whose name matches the specified memory type does not contain a pointer, the runtime code 224 copies the general function pointer to the virtual function table for that entry. Control then continues to block 650, as previously described above.

Although FIG. 6 has been described in terms of memory types of DRAM and PCM, in other embodiments any number of memory types and any categories of memory types may exist. In this way, the runtime code 224 creates different virtual function tables assigned to different memory types and saves pointers to the different virtual function tables into different object that are allocated in memory of the respective different types.

Figure 7:
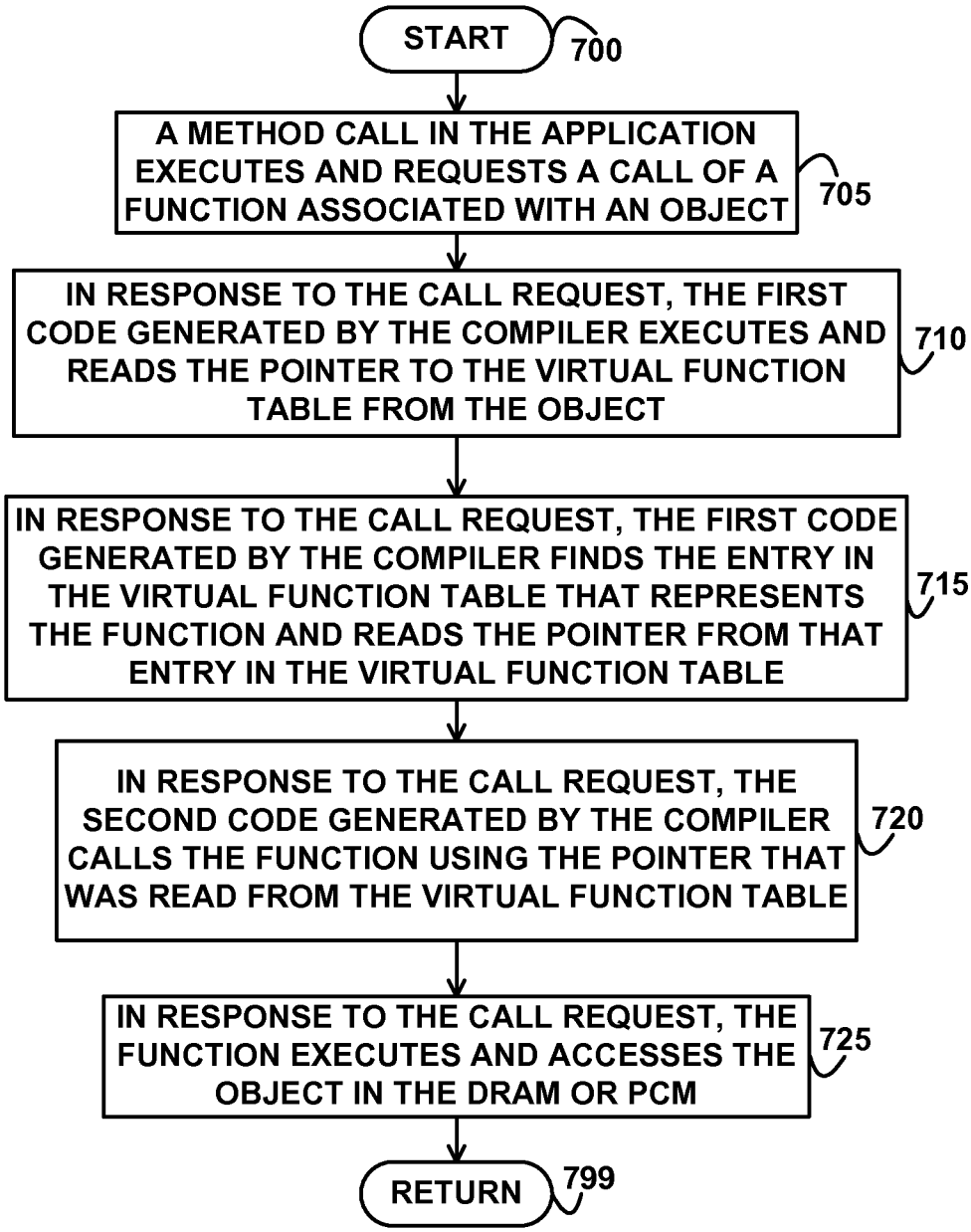
FIG. 7 depicts a flowchart of example processing for a call of a function, according to an embodiment of the invention.

FIG. 7 depicts a flowchart of example processing for a call of a function, according to an embodiment of the invention. The logic of FIG. 7 is executed for every call to every function, so that the logic of FIG. 7 may be executed multiple times in response to multiple calls to the same function and/or for calls to different functions. Control begins at block 700.

Control then continues to block 705 where a method call 240 in the application 202 executes on the processor 101 and requests a call of a function 230, 231, 232, 233, 234, or 235 associated with an object 210, 212, or 214 or that identifies an object 210, 212, or 214. Control then continues to block 710 where, in response to the call request, the first code generated by the compiler 226 reads the pointer 250, 252, or 254 to the virtual function table 220 or 222 from the identified or associated object. Control then continues to block 715 where, in response to the call request, the first code generated by the compiler 226 finds the entry in the virtual function table 220 or 222 that represents the function 230, 231, 232, 233, 234, or 235 and reads the pointer from that entry in the virtual function table 220 or 222. Control then continues to block 720 where the second code generated by the compiler 226 calls the function 230, 231, 232, 233, 234, or 235 using the pointer that was read from the virtual function table 220 or 222. Control then continues to block 725 where, in response to the call, the function 230, 231, 232, 233, 234, or 235 begins executing on the processor 101 and accesses the object (reads and/or writes the object) 210, 212, or 214 in the memory 102 having the type assigned to the virtual function table 220 or 222 that is pointed to by the pointer 250, 252, or 254 in the object 210, 212, or 214. Control then continues to block 799 where the logic of FIG. 7 returns.

In this way, an embodiment of the invention provides for varying functions against objects, depending on the type of memory in which the objects are allocated. An embodiment of the invention enables storage-sensitive methods and functions for objects, with the correct method being inserted into the virtual function table upon object allocation, based on the memory type in which the object is allocated in, which enables the support of multiple types of memory by computer systems.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   in response to reading a declaration of a function that specifies a name of the function and a type of memory on which the function operates, saving the name of the function, a pointer to the function, and the type of memory to a template, the type of memory being at least one of a plurality of memory types available in a computer system;
   in response to reading a call statement that specifies the name of the function and an identifier of an object, generating first code that when executed: (a) reads the pointer to the function from a virtual function table pointed to by the object, the virtual function table pointed to by the object being one of a plurality of virtual function tables each assigned to a different respective type of memory, the virtual function table pointed to by the object being assigned to the type of memory for containing the object, (b) finds an entry in the virtual function table pointed to by the object that represents the function, and (c) reads the pointer from the entry in the virtual function table pointed to by the object, wherein the call statement, when executed, requests a call of the function;
   generating second code that, when executed on said computer system, calls the function using the pointer read from the virtual function table pointed to by the object;
   in response to a request for allocation of the object, wherein the request specifies the type of the memory in which the object is requested to be allocated, allocating the object in the memory and determining whether the virtual function table assigned to the type of memory exists; and
   wherein at least one virtual function table of the plurality of virtual function tables is assigned to the type of memory which is either a dynamic random access memory (DRAM) or a phase change memory (PCM).

2. The method of claim 1, further comprising: if the virtual function table assigned to the type of memory does not exist, creating the virtual function table that is assigned to the type of memory and saving a pointer to the function that operates on the object stored in the memory into the virtual function table that is assigned to the type of memory.

3. The method of claim 2, further comprising:
   saving a pointer to the virtual function table assigned to the type of memory into the object.

4. The method of claim 2, wherein the saving the pointer to the function that operates on the object stored in the memory into the virtual function table that is assigned to the type of memory further comprises: if the template specifies the pointer to the function that is assigned to the type of memory, copying the pointer to the function into the virtual function table.

5. The method of claim 2, wherein the saving the pointer to the function that operates on the object stored in the memory into the virtual function table that is assigned to the type of memory, further comprises: if the template does not specify the pointer to the function that is assigned to the type of memory, copying a general function pointer from the template to the virtual function table, wherein the general function pointer comprises an address of a general function that accesses the object stored in all types of the memory.

6. The method of claim 1, further comprising:
   in response to a call of the function, executing the first code and the second code.

7. A non-transitory computer-readable storage medium encoded with instructions, wherein the instructions when executed comprise:
   in response to reading a declaration of a function that specifies a name of the function and a type of memory on which the function operates, saving the name of the function, a pointer to the function, and the type of memory to a template, the type of memory being at least one of a plurality of memory types available in a computer system;
   in response to reading a call statement that specifies the name of the function and an identifier of an object, generating first code that when executed' (a) reads the pointer to the function from a virtual function table pointed to by the object, the virtual function table pointed to by the object being one of a plurality of virtual function tables each assigned to a different respective type of memory, the virtual function table pointed to by the object being assigned to the type of memory for containing the object, (b) finds an entry in the virtual function table pointed to by the object that represents the function, and (c) reads the pointer from the entry in the virtual function table pointed to by the object, wherein the call statement, when executed, requests a call of the function;
   generating second code that, when executed on said computer system, calls the function using the pointer read from the virtual function table pointed to by the object;
   in response to a request for allocation of the object, wherein the request specifies the type of the memory in which the object is requested to be allocated, allocating the object in the memory and determining whether the virtual function table assigned to the type of memory exists, and wherein at least one virtual function table of the plurality of virtual function tables is assigned to the type of memory which is either a dynamic random access memory (DRAM) or a phase change memory (PCM).

8. The non-transitory computer-readable storage medium of claim 7, further comprising: if the virtual function table assigned to the type of memory does not exist, creating the virtual function table that is assigned to the type of memory and saving a pointer to the function that operates on the object stored in the memory into the virtual function table that is assigned to the type of memory.

9. The non-transitory computer-readable storage medium of claim 8, further comprising: saving a pointer to the virtual function table assigned to the type of memory into the object.

10. The non-transitory computer-readable storage medium of claim 8, wherein the saving the pointer to the function that operates on the object stored in the memory into the virtual function table that is assigned to the type of memory further comprises: if the template specifies the pointer to the function that is assigned to the type of memory, copying the pointer to the function into the virtual function table.

11. The non-transitory computer-readable storage medium of claim 8, wherein the saving the pointer to the function that operates on the object stored in the memory into the virtual function table that is assigned to the type of memory further comprises: if the template does not specify the pointer to the function that is assigned to the type of memory, copying a general function pointer from the template to the virtual function table, wherein the general function pointer comprises an address of a general function that accesses the object stored in all types of the memory.

12. The non-transitory computer-readable storage medium of claim 7, further comprising:
in response to a call of the function, executing the first code and the second code.

13. A computer comprising:
a processor; and
memory communicatively coupled to the processor, wherein the memory is encoded with instructions, and wherein the instructions when executed on the processor comprise:
in response to reading a declaration of a function that specifies a name of the function and a type of memory on which the function operates, saving the name of the function, a pointer to the function, and the type of memory to a template, the type of memory being at least one of a plurality of memory types available in a computer system;
in response to reading a call statement that specifies the name of the function and an identifier of an object, generating first code that when executed (a) reads the pointer to the function from a virtual function table pointed to by the object, the virtual function table pointed to by the object being one of a plurality of virtual function tables each assigned to a different respective type of memory, the virtual function table pointed to by the object being assigned to the type of memory for containing the object, (b) finds an entry in the virtual function table pointed to by the object that represents the function, and (c) reads the pointer from the entry in the virtual function table pointed to by the object, wherein the call statement, when executed, requests a call of the function;
generating second code that, when executed on said computer system, calls the function using the pointer read from the virtual function table pointed to by the object;
in response to a request for allocation of the object, wherein the request specifies the type of the memory in which the object is requested to be allocated, allocating the object in the memory and determining whether the virtual function table assigned to the type of memory exists; and
wherein at least one virtual function table of the plurality of virtual function tables is assigned to the type of memory which is either a dynamic random access memory (DRAM) or a phase change memory (PCM).

14. The computer of claim 13, wherein the instructions further comprise: if the virtual function table assigned to the type of memory does not exist, creating the virtual function table that is assigned to the type of memory and saving a pointer to the function that operates on the object stored in the memory into the virtual function table that is assigned to the type of memory.

15. The computer of claim 14, wherein the instructions further comprise: saving a pointer to the virtual function table assigned to the type of memory into the object.

16. The computer of claim 14, wherein the saving the pointer to the function that operates on the object stored in the memory into the virtual function table that is assigned to the type of memory further comprises: if the template specifies the pointer to the function that is assigned to the type of memory, copying the pointer to the function into the virtual function table.

17. The computer of claim 14, wherein the saving the pointer to the function that operates on the object stored in the memory into the virtual function table that is assigned to the type of memory further comprises: if the template does not specify the pointer to the function that is assigned to the type of memory, copying a general function pointer from the template to the virtual function table, wherein the general function pointer comprises an address of a general function that accesses the object stored in all types of the memory.

18. The computer of claim 13, wherein the instructions further comprise:
in response to a call of the function, executing the first code and the second code.

* * * * *